(12) United States Patent
Leung

(10) Patent No.: US 9,713,776 B1
(45) Date of Patent: Jul. 25, 2017

(54) COLLAPSIBLE AND PORTABLE SHAPE-SORTING LEARNING AND DEVELOPMENT TOY

(71) Applicant: Dwight N Leung, Fallbrook, CA (US)

(72) Inventor: Dwight N Leung, Fallbrook, CA (US)

( * ) Notice: Subject to any disclaimer, the term of this patent is extended or adjusted under 35 U.S.C. 154(b) by 0 days.

(21) Appl. No.: 15/079,315

(22) Filed: Mar. 24, 2016

(51) Int. Cl.
| | | |
|---|---|---|
| *A63F 9/06* | (2006.01) | |
| *A47D 15/00* | (2006.01) | |
| *A63H 33/00* | (2006.01) | |
| *G09B 19/00* | (2006.01) | |
| *A47G 1/02* | (2006.01) | |
| *A47G 1/06* | (2006.01) | |
| *A47G 1/14* | (2006.01) | |

(52) U.S. Cl.
CPC ............. *A63H 33/00* (2013.01); *A47D 15/00* (2013.01); *A47G 1/02* (2013.01); *A47G 1/06* (2013.01); *A47G 1/14* (2013.01); *A63F 9/0666* (2013.01); *A63H 33/006* (2013.01); *G09B 19/00* (2013.01); *A47G 2001/0688* (2013.01); *A63F 2009/0668* (2013.01)

(58) Field of Classification Search
CPC ........... A63F 2009/0668; A63F 9/0666; A47D 15/008; A63H 33/00; A63H 33/006
USPC ................. 434/259; 446/227, 75; 5/658, 946
See application file for complete search history.

(56) References Cited

U.S. PATENT DOCUMENTS

| | | | | | |
|---|---|---|---|---|---|
| 741,903 | A | * | 10/1903 | Gates | ......................... A63F 9/06 273/153 R |
| 2,623,303 | A | * | 12/1952 | Mindel | ...................... A63F 9/06 434/259 |
| 3,280,499 | A | * | 10/1966 | Studen | ....................... A63F 9/10 273/156 |
| 3,755,938 | A | * | 9/1973 | Bytwork | .................. G09F 23/14 40/530 |
| 4,149,717 | A | * | 4/1979 | Seijiro | ....................... A63F 9/12 273/157 R |
| 4,195,421 | A | * | 4/1980 | Tucker | ...................... A63F 9/00 434/259 |
| 4,306,868 | A | * | 12/1981 | Hankins | ................ A63F 3/0423 434/159 |
| 4,541,190 | A | * | 9/1985 | Weiner | ................... B60Q 7/005 40/124.15 |
| 5,029,797 | A | * | 7/1991 | Levorchick | ............... A63F 1/10 248/459 |
| 5,139,453 | A | * | 8/1992 | Aiken | ................... A63F 7/0668 434/259 |
| 5,413,305 | A | * | 5/1995 | Leeb | ..................... A47B 23/043 248/450 |
| 5,674,103 | A | * | 10/1997 | Bean | ..................... A63F 9/0666 206/457 |
| 6,026,528 | A | * | 2/2000 | Pina | ........................ A47D 15/00 40/617 |
| 6,113,454 | A | * | 9/2000 | Mitchell | ................ A63H 33/00 446/227 |

(Continued)

*Primary Examiner* — Alexander Niconovich

(74) *Attorney, Agent, or Firm* — Law Office and Scott C Harris, Inc.

(57) ABSTRACT

A multi-component collapsible and portable shape-sorting learning and development toy including a soft housing, an aperture plate element with a plurality of openings together with a matching number of blocks adapted to be inserted in the openings of the aperture plate element, a photographic display element, and a baby-safe mirror element. The toy and the individual component parts are adapted to a variety of uses for play.

11 Claims, 8 Drawing Sheets

(56) References Cited

U.S. PATENT DOCUMENTS

| | | | | |
|---|---|---|---|---|
| 6,170,101 B1* | 1/2001 | McCloud | A47D 15/008 | 5/424 |
| 6,301,731 B1* | 10/2001 | Jakubowski | A47D 13/06 | 446/227 |
| 6,626,678 B2* | 9/2003 | Forbes | A63F 9/0666 | 273/153 R |
| 6,755,713 B1* | 6/2004 | Weber | A63H 5/00 | 446/143 |
| 6,799,337 B1* | 10/2004 | Raphael-Davis | A47D 7/00 | 5/658 |
| 7,225,573 B2* | 6/2007 | Shaffer | G09F 1/06 | 40/124.05 |
| 7,238,026 B2* | 7/2007 | Brown | G09B 5/06 | 434/258 |
| 7,287,751 B2* | 10/2007 | Webber, Jr. | A63F 3/00694 | 273/239 |
| 7,441,358 B1* | 10/2008 | Ngan | G09F 1/10 | 281/33 |
| 8,814,625 B1* | 8/2014 | Long | A63H 33/006 | 446/175 |
| 2002/0026669 A1* | 3/2002 | Carroll | A47D 15/008 | 5/100 |

* cited by examiner

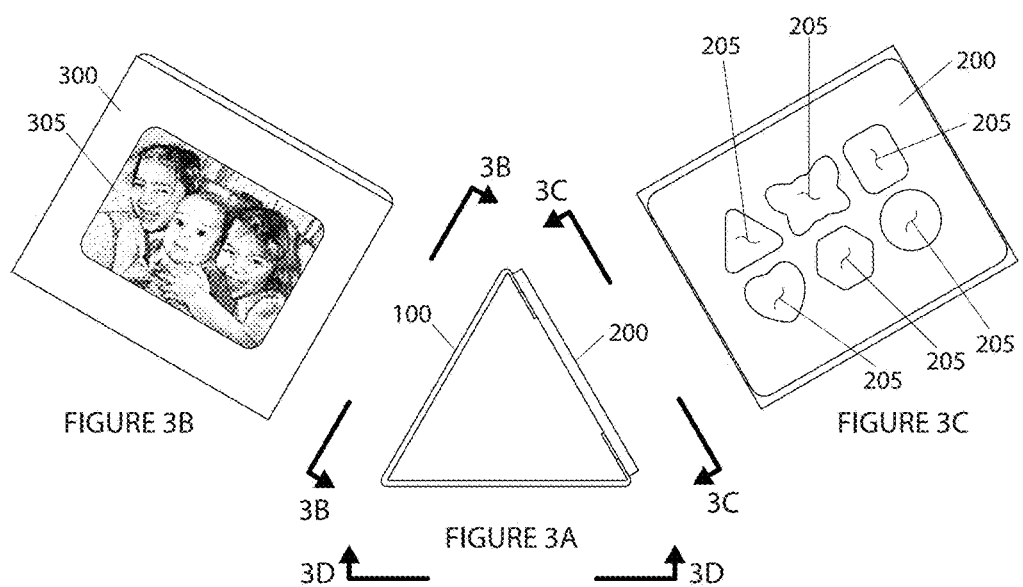
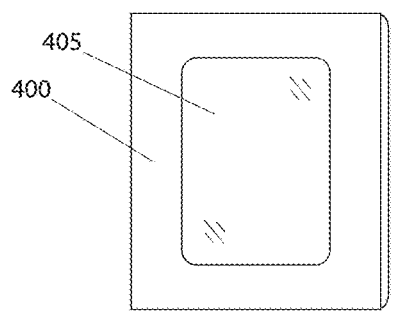

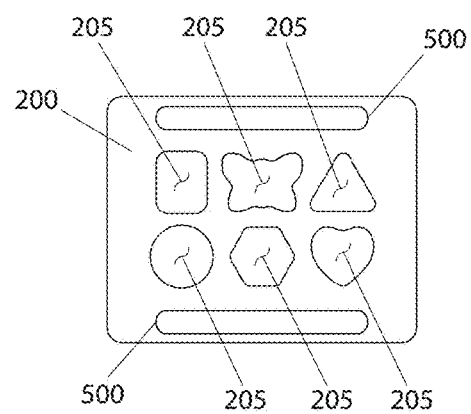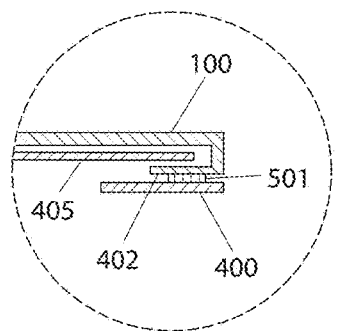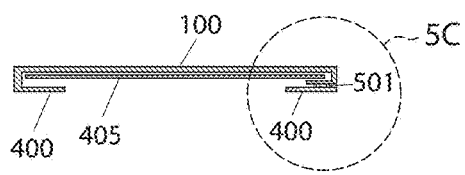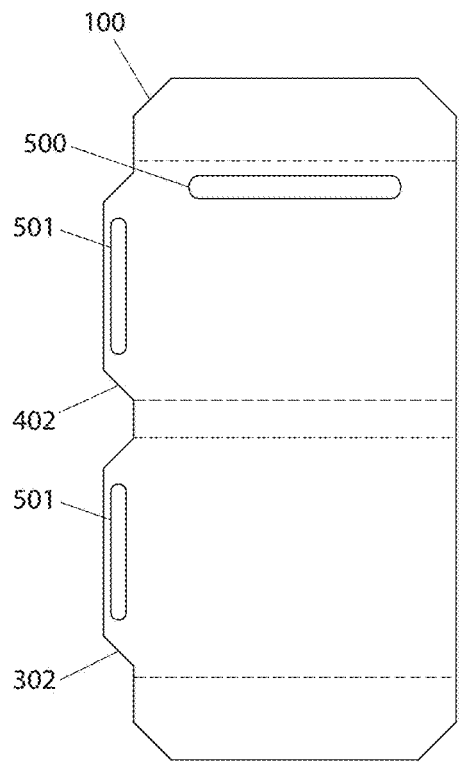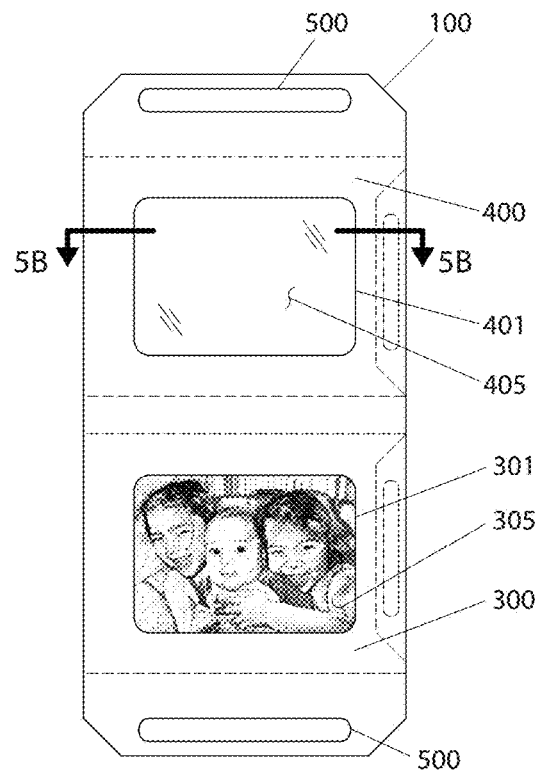
FIGURE 5A
FIGURE 5C
FIGURE 5B
FIGURE 5D
FIGURE 5E

COLLAPSIBLE AND PORTABLE SHAPE-SORTING LEARNING AND DEVELOPMENT TOY

BACKGROUND

Shape-sorting toys have been classic toddler favorites for many years and are still one of the most popular types of toys available today. Toddlers learn about shapes and develop manual dexterity by dropping geometric blocks through matching apertures.

This activity is beneficial to toddlers by helping them to understand spatial concepts, to develop problem-solving skills, to practice hand-eye coordination, and to interact with parents, siblings and friends.

The presentation of shape-sorting toys is a mature and well-known art as evidenced by U.S. Pat. No. 741,903 to Gates describing an educational toy or game apparatus, U.S. Pat. No. 2,623,303 to Mindel describing an educational toy, U.S. Pat. No. 4,008,526 to Swett et. al. describing openable curvilinear openings of different geometrical shapes and U.S. Pat. No. 5,139,453 to Aiken et. al. describing a shape sorting educational toy.

Shape-sorting toys of the prior art typically use a hollow receptacle with the outer surface having a plurality of apertures of different shapes and a plurality of blocks configured to allow for insertion through a single aperture. The known devices are constructed such that they allow correctly-matched blocks to drop through the apertures into a hollow receptacle.

Dropping blocks into a receptacle provides entertainment value and develops the cause and effect skills of a child. However, to provide the dropping effect, the toys described in the prior art are bulky and have not been designed to be collapsible and portable for travel or for convenient storage.

SUMMARY

Embodiments describe a multi-component collapsible and portable toy including a soft housing, an aperture plate element with a plurality of openings together with a matching number of blocks adapted to be inserted in the openings of the aperture plate element, a photographic display element, and a baby-safe mirror element.

An object of the embodiments is to provide a shape-sorting toy, with new and improved features providing a novel, safe, entertaining and educational shape-sorting toy that is also collapsible and portable allowing for travel and convenient storage.

When configured for play, the toy forms a triangular cross-sectional shape such that one side of the triangle provides a dropping effect when the geometric blocks are inserted through matching apertures. The other two sides of the triangular shape offer additional entertainment value for infants or toddlers by providing other surfaces for display, e.g., of a photographic display element and a baby-safe mirror element.

When configured for travel or storage, the toy folds flat into its supports, allows for secure storage of the blocks and forms a flat rectangular shape.

As a result of its unique design, another object of the presented invention is to provide play value for both infants and toddlers. The photographic display and mirror elements will appeal to infants while the shape-sorting feature will appeal to toddlers.

A further object of the presented invention is offered by the soft housing. The geometry of the toy and resilient construction eliminate pinch points at all the hinge areas of the soft housing. This attribute provides an added safety feature in the event a child's finger creates an obstruction in the housing hinges.

The soft housing is designed with integral pockets to house the photographic display element and the mirror element. The aperture plate element is secured by hook-and-loop (e.g., VELCRO™) fasteners. The aperture plate element, photographic display element, and mirror element can all be easily removed from the soft housing to allow for effective cleaning of all component parts.

The design of the soft housing allows the toy to be customizable by replacing the aperture plate and matching blocks with alternate modular aperture plate-and-block sets composed of different shapes, colors, or materials to provide a variety of challenges to the child.

When the aperture plate element is removed, the design of the soft housing hook-and-loop (VELCRO™) fastener closure allows the toy to be attached to a crib for use as a baby crib mirror, crib photograph display housing or crib art display housing.

The invention and its objects, features and advantages will be further described in reference to the following accompanying illustrative drawings.

DESCRIPTION OF THE DRAWINGS

FIG. 3A is a left side view of the open position of the Shape-sorting Learning and Developmental Toy invention.

FIG. 3B is an auxiliary projected view of the photographic display element of the Shape-sorting Learning and Developmental Toy invention.

FIG. 3C is an auxiliary projected view of the aperture plate element of the Shape-sorting Learning and Developmental Toy invention.

FIG. 3D is an auxiliary projected view of the mirror element of the Shape-sorting Learning and Developmental Toy invention.

FIG. 5A is an illustration showing the aperture plate element, its openings and hook-and-loop fasteners.

FIG. 5B is a cross-sectional view of the assembled soft housing and mirror element.

FIG. 5C is an enlarged view of the folded and tucked closure flap utilizing the hook-and-loop fastener to secure the mirror element soft housing pocket.

FIG. 5D is an unfolded outer view of the soft housing with the closure flaps extended in the open position and the aperture plate element detached.

FIG. 5E is an unfolded inner view of the soft housing with the photographic display and mirror elements inserted into their pockets, the closure flaps folded and tucked into their respective pockets and the aperture plate element detached.

DETAILED DESCRIPTION

Figure 6A:
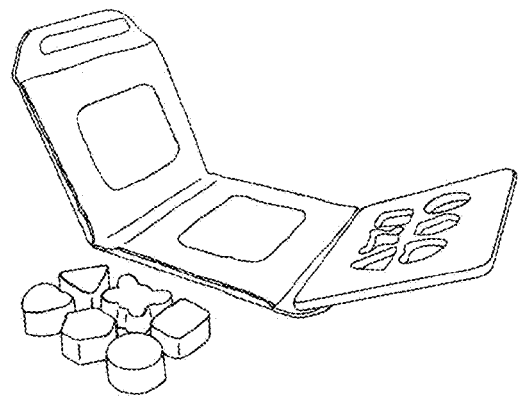
FIG. 6A is an illustration showing a partially folded view of the invention with the geometric blocks preparing the invention for travel or storage.
Figure 6B:
FIG. 6B is an illustration showing a partially folded view of the invention with the Aperture plate in the stored position and the geometric blocks preparing the invention for travel or storage.
Figure 6C:
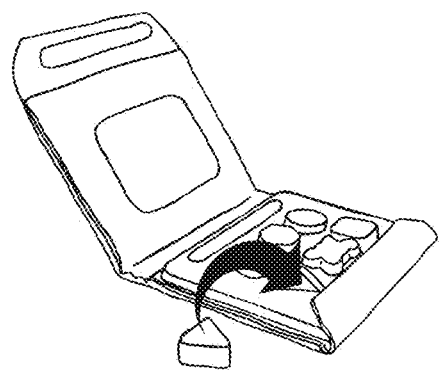
FIG. 6C is an illustration showing a partially folded view of the invention with the Aperture Plate in the stored position and the geometric blocks being inserted into their matching apertures preparing the invention for travel or storage.
Figure 6D:
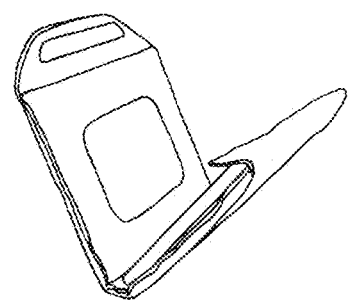
FIG. 6D is an illustration showing the invention folding to the closed position to prepare for travel or storage.
Figure 6E:
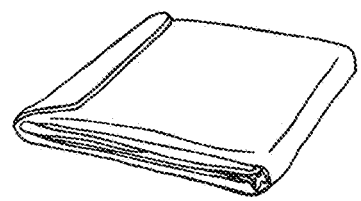
FIG. 6E is an illustration of the invention in the closed position folded for travel or storage.

Embodiments are usable in two primary configurations. A first configuration is the open triangular configuration shown in FIG. 1. This is the configuration where the toy will be used for shape sorting and viewing. A second closed or storage configuration is shown in FIG. 6E. Both configurations are comprised of the same component parts, namely the soft housing 100, an aperture plate element 200, geometric blocks 210 that match the openings 205 of the aperture plate element, a photographic display element, and a mirror element, but the parts are folded differently.

The soft housing may be formed from cloth or a soft semi-rigid molded material such as ethylene-vinyl acetate ("EVA"). In the open position as shown in FIG. 1, FIGS. 2A-2C and FIGS. 3A-3D, the housing 100 is comprised of three sections in a trifold design with one surface 300 of the triangle retaining the photographic display element 305, another surface 400 retaining the mirror element 405 and the final surface 200 retaining the aperture plate element. FIGS. 1, 2A-2C and 3A-3D illustrate all components of the Shape-sorting Learning and Developmental Toy invention. The photographic display elements 305 and the mirror element 405 (shown in FIG. 4D) are secured within pockets in the soft housing 100 by folding the closure flaps, 302 and 402 (shown in FIGS. 4C and 5D), and tucking them into the pockets. The closure flaps are secured with the attached hook-and-loop fasteners, 501. The closure flap for the mirror element, 402, is shown folded, tucked and securing the mirror element in FIGS. 5B and 5C. Each pocket has an opening, 301 and 401 (shown in FIG. 4C), to view the photographic display and mirror elements. The aperture plate element 200 is secured to the soft housing with hook-and-loop (VELCRO™) fasteners 500 (shown in FIGS. 5A and 5E) such that when connected the aperture plate forms the final leg of the structural triangular shape. All component parts are easily removable to allow for effective cleaning.

Figure 1:
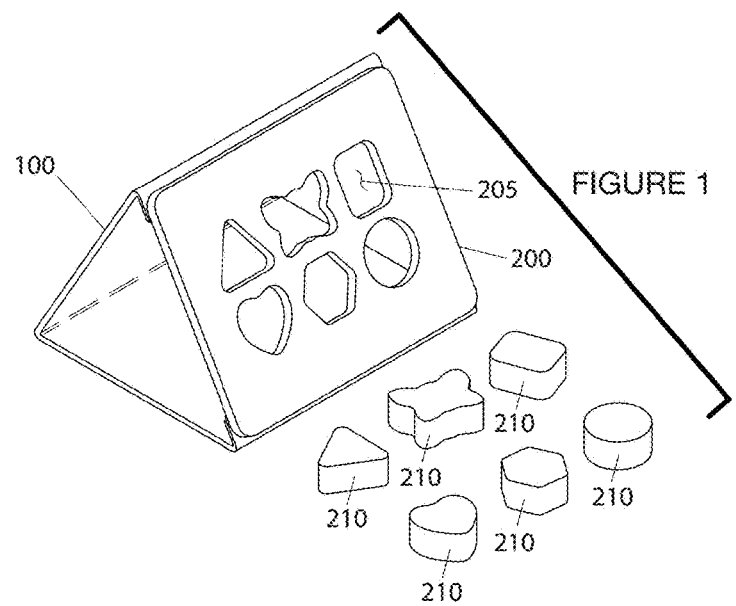
FIG. 1 is an illustration of the Collapsible and Portable Shape-sorting Learning and Developmental Toy invention in the open position showing the aperture plate element side facing outward along with the blocks matching the aperture plate openings.
Figure 2A:
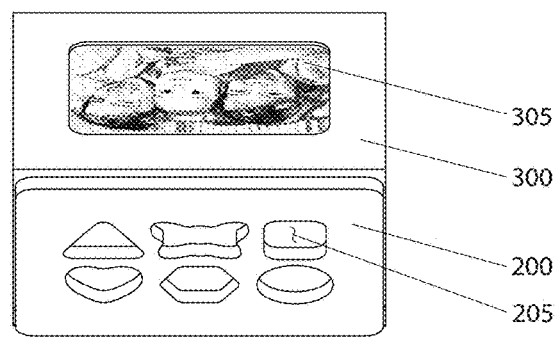
FIG. 2A is a top view of the open position of the Shape-sorting Learning and Development Toy invention.
Figure 2B:
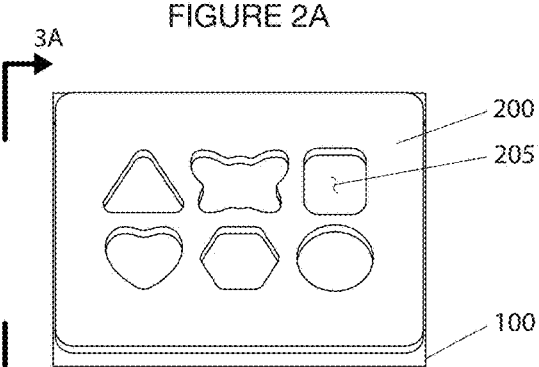
FIG. 2B is a front view of the open position of the Shape-sorting Learning and Development Toy invention.
Figure 2C:
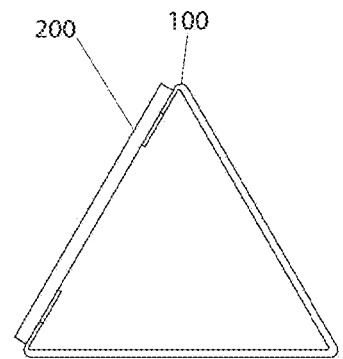
FIG. 2C is a right side view of the open position of the Shape-sorting Learning and Development Toy invention.

In the open configuration of FIG. 1, the soft housing is designed to fold into a triangular cross-sectional shape for play. In the stored configuration of FIG. 6E, the housing is designed to protect and securely retain all component parts, folding flat for ease of storage and transportation as shown in FIGS. 6A-6E. In both the open and closed configurations, the housing is designed to securely hold each configuration in place by means of hook-and-loop (VELCRO™) closures 500.

Figure 4A:
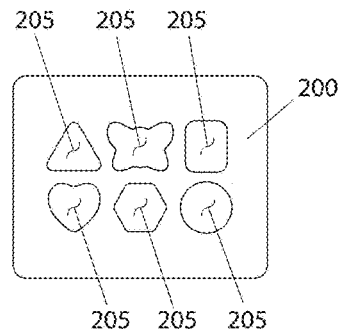
FIG. 4A is an illustration showing the aperture plate element and its openings.
Figure 4B:
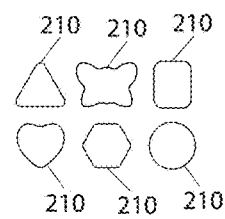
FIG. 4B is an illustration showing the geometric shaped blocks matching the aperture plate openings.
Figure 4C:
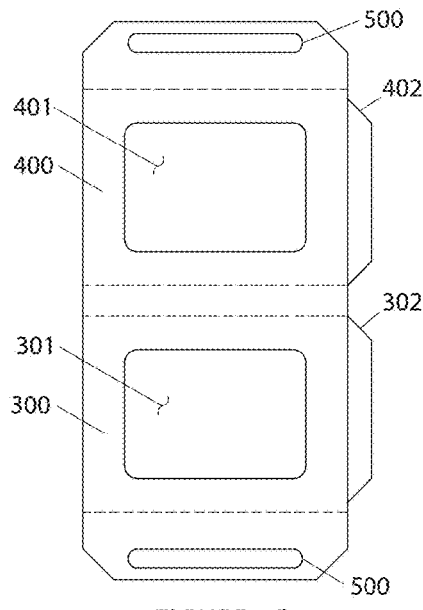
FIG. 4C is an illustration showing the unfolded inner view of the soft housing, its openings and hook-and-loop fasteners.
Figure 4D:
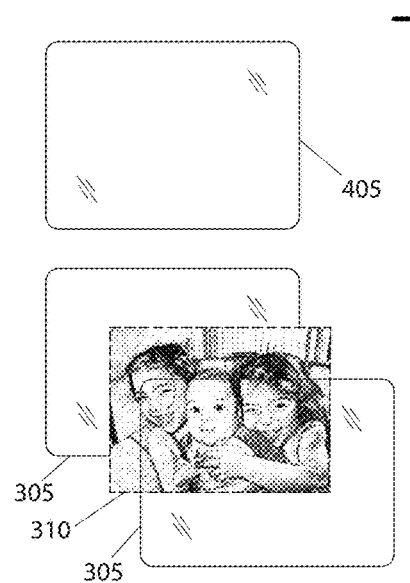
FIG. 4D is an illustration showing the mirror and photographic display components.

The aperture plate element 200 as shown in FIG. 4A is constructed from wood or plastic with a plurality of shaped openings 205 for use with a plurality of geometric blocks 210 as shown in FIG. 4B. Block pieces are constructed from wood or plastic with a plurality of shapes adapted to match and to be inserted into the openings of the aperture plate element. Together, both the aperture plate and blocks form the invention's shape-sorting function when open. When closed, the blocks are conveniently stored inside the invention, nested within the aperture plate element.

The photographic display element as shown in FIG. 3B is formed by two clear plastic plates 305 (FIG. 4D) that allow a photograph 310, piece of art, or any item that can be displayed on any comparably sized media to be inserted between them.

The baby-safe mirror element 405 as shown in FIG. 3D provides a reflective surface that helps an infant's development of self-awareness. It also helps infants learn how to focus, track images, and explore facial movements and expressions.

Figure 7:
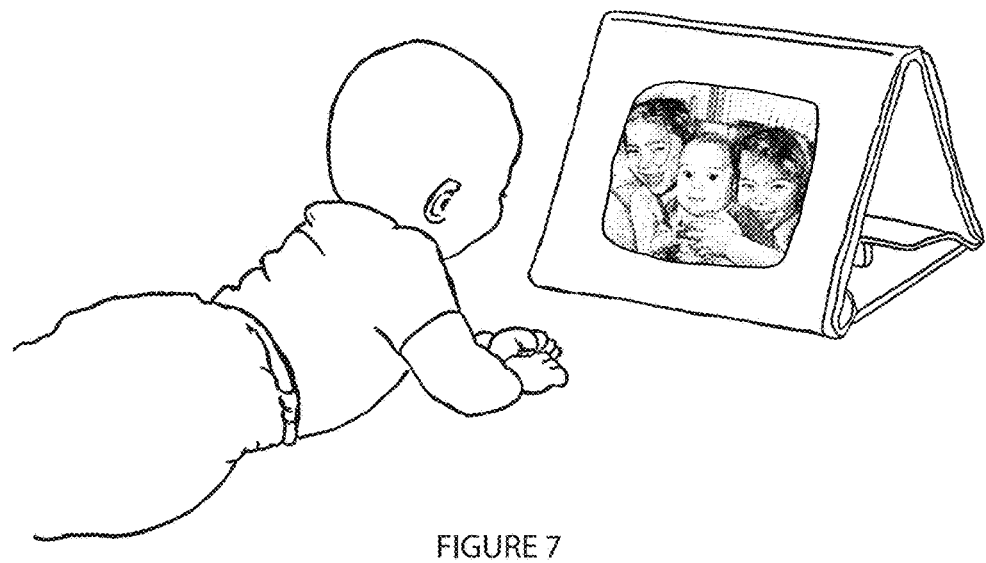
FIG. 7 is an operational illustration of the invention in the open position showing the photographic display element facing outward.
Figure 8:
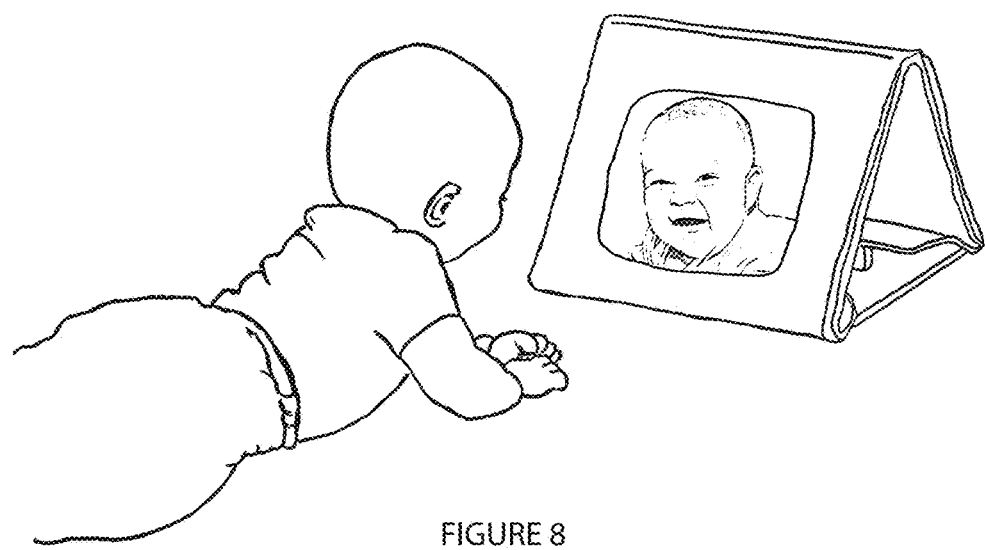
FIG. 8 is an operational illustration of an infant utilizing the mirror element of the invention.
Figure 9:
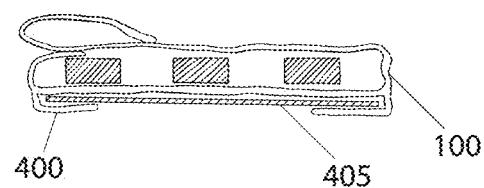
FIG. 9 is cross-sectional view of the soft housing with the aperture plate removed for use as a crib mirror.
Figure 10:
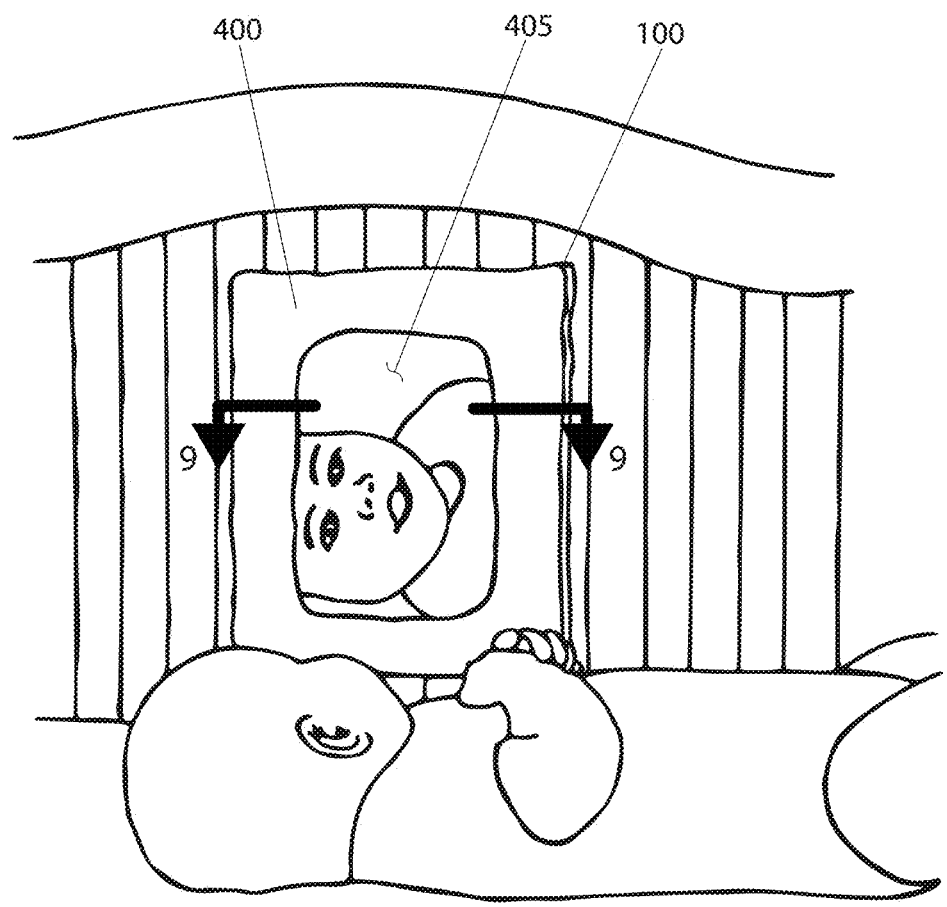
FIG. 10 is an operational illustration of an infant utilizing the mirror element of the invention attached in the crib configuration.

The toy according to the invention and the individual component parts are adapted to a variety of uses for play. In the triangular configuration shown in FIG. 1, the child may play with the shape-sorting feature. If the invention is turned to show the photographic display element as shown in FIG. 7, or the mirror element as shown in FIG. 8, the child may interact with any image that has been inserted into the photographic display element or with his or her own reflection. In a flat open configuration all of the previously mentioned features are available, however the shape-sorting feature functions as a puzzle. In addition, as shown in FIG. 10 when the aperture plate is removed from the soft housing the toy may be attached to the rails of a crib (cross-section shown in FIG. 9) to be used as an infant mirror, a photo display or an art display.

Figure 11:
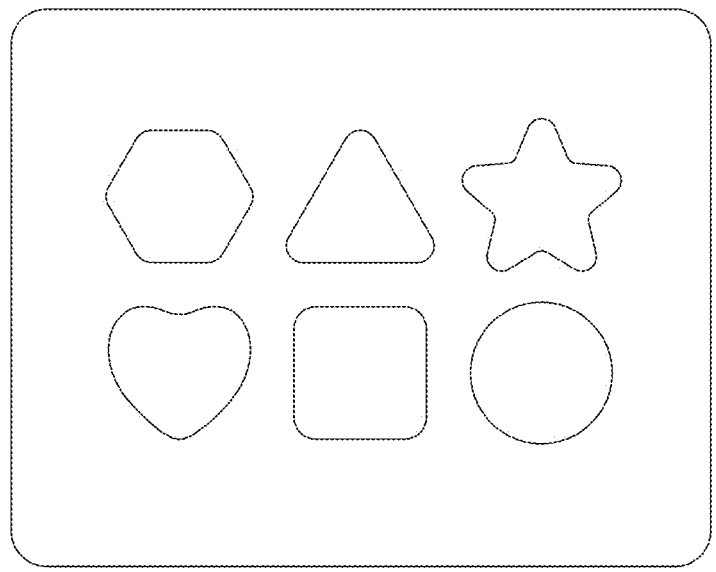
FIG. 11 is an illustration of a potential shape configuration for the aperture plate element.
Figure 12:
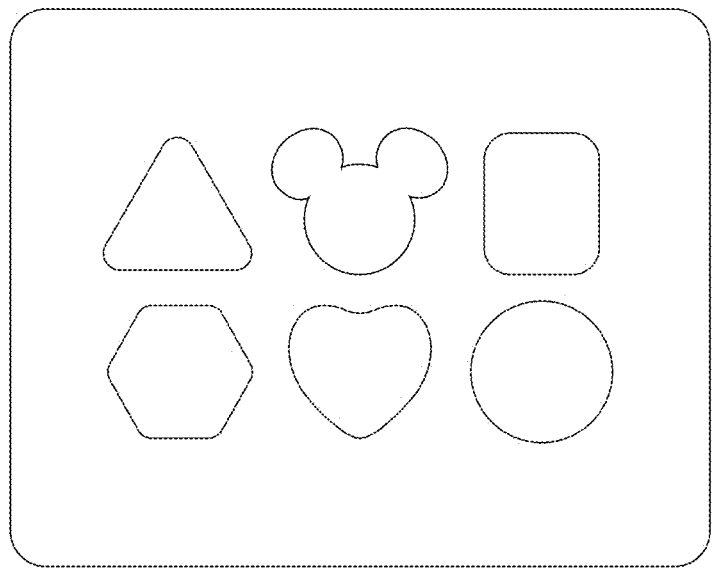
FIG. 12 is an illustration of another potential shape configuration for the aperture plate element.

The modular design of the invention allows for customization by replacing the aperture plate and matching blocks with alternate modular aperture plate-and-block sets composed of different shapes, colors, or materials to provide a variety of challenges to the child. FIG. 11 shows the aperture plate configured with a hexagon, triangle, star, heart, square and circle. FIG. 12 shows an alternate design configured with a triangle, mouse, rectangle, hexagon, heart and circle. Other implementations are contemplated. For example, although the above describes specific shapes, it should be understood that other shapes besides the specific shapes could be used. The above has described the shapes being triangular, circular, rectangular, hexagonal, heart, butterfly and mouse shaped. More generally, any shape of any type can be used. Preferably, the shapes are used such that no shape can fit through any slot other than the intended slot, so that shape sorting can be carried out in this way.

What is claimed is:

1. A Collapsible and Portable Shape-sorting Learning and Development Toy comprising:
   a. a housing portion formed of a soft and flexible material, the housing portion comprising a first flat segment, a second flat segment, and a third flat segment, said first and second segments attached to one another and foldable relative to one another; and the first and second segments connectable to and removable from the third segment,
   and said first and second segments being foldable relative to the third segment, when connected,
   and the segments being foldable to be opened into a self-supporting structure with a cross-sectional triangular shape formed from complete surfaces of each of said first segment, said second segment and said third segment, where the triangular shape is formed by the first segment, said second segment and said third segment being connected together at their edges,
   and where the triangular shaped housing portion includes inner surfaces defining an inner triangular shape when the third segment is connected to the first and second segments, and where each of the first segment, second segment and third segment define a surface with a different entertainment function thereon;
   b. one of the segments being an aperture plate element with multiple differently-shaped apertures forming one of the sides of the triangular shape, each of the apertures having a different shape defined by a perimeter of the aperture, said one of the segments defining shape sorting as a first of the entertainment functions;
   c. further comprising plural blocks which are shaped to match and fit through the differently shaped apertures, where each of the blocks are shaped with an outer shape matching to one of the perimeters of the apertures, to fit through the one of the apertures and where each block only fits through the one perimeter, and does not fit through the other apertures,
   and where, when the first, second and third segments are connected to one another to collectively form the triangular shaped housing portion which is free standing in the triangular shape, blocks which fit through said perimeters fall to the inner surfaces of the triangular shape;
   d. another of the segments being a photographic display element, having a pocket in the soft housing, forming of the sides of the triangular shape and having a surface of clear plastic that holds a viewable item on under the surface of clear plastic, between the surface of the clear plastic and a surface of the another of the segments, such that the viewable item is viewed from an outside of the triangular shape, said another of the segments having photographic viewing as a second of the entertainment functions;
   e. and yet another of the segments forming a baby-safe mirror element secured within a pocket of the soft housing and forming of the sides of the triangular shape, said yet of the segments having mirror viewing as a third of the entertainment functions.

2. A toy as in claim 1, wherein the first segment is the aperture plate element, and where the aperture plate element is removable, and further comprising a different aperture plate element having different apertures defining different shapes, and a different matching block set with shapes matching the different aperture plate element.

3. A toy as in claim 1, wherein the segments are foldable into a flat and collapsed condition, and where when folded flat, surfaces on the aperture plate define a location for the blocks within the aperture plate.

4. A toy as in claim 1, wherein the soft housing creates a soft flexible safe hinge that eliminates pinch points.

5. A toy as in claim 1, wherein the photographic display element provides structural rigidity to one side of the triangular cross-sectional shape.

6. A toy as in claim 1, wherein the baby-safe mirror element provides structural rigidity to one side of the triangular cross-sectional shape for play.

7. A toy as in claim 1, wherein the aperture plate element provides structural rigidity to one side of the triangular cross-sectional shape for play.

8. A toy as in claim 1, wherein aperture plate element is the first segment.

9. The toy as in claim 8, wherein the soft housing, with the aperture plate removed, is attachable to a part with a hook-and-loop closure element and used as a mirror, photographic display or art display for an infant.

10. The toy as in claim 1, wherein the material of the segments is cloth or a soft semi-rigid molded material of ethylene-vinyl acetate.

11. The toy as in claim 1, wherein the segments are connected by hook-and-loop fasteners.

* * * * *